(12) United States Patent
Abdillah et al.

(10) Patent No.: US 8,897,599 B2
(45) Date of Patent: Nov. 25, 2014

(54) IMAGE SYSTEM DESIGNED TO SCAN FOR SECURITY THREATS

(75) Inventors: Mohammed Ben Abdillah, Ballincollig (IE); Emil Entchev, Ballincollig (IE); Adam Widera, Ballincollig (IE); John McNaboe, Ballincollig (IE); Brendan Lyons, Ballincollig (IE); Claudius Volz, Wiesbaden (DE); Pia Dreiseitel, Eschborn (DE); Claus Meder, Rossdorf (DE)

(73) Assignee: Smiths Detection Ireland Limited, Ballincollig (IE)

(*) Notice: Subject to any disclaimer, the term of this patent is extended or adjusted under 35 U.S.C. 154(b) by 197 days.

(21) Appl. No.: 13/376,406

(22) PCT Filed: Jun. 11, 2010

(86) PCT No.: PCT/IE2010/000037
§ 371 (c)(1),
(2), (4) Date: Dec. 6, 2011

(87) PCT Pub. No.: WO2010/143174
PCT Pub. Date: Dec. 16, 2010

(65) Prior Publication Data
US 2012/0093438 A1    Apr. 19, 2012

(30) Foreign Application Priority Data
Jun. 12, 2009   (IE) .................................. 2009/0462

(51) Int. Cl.
*G06K 9/36* (2006.01)
*G06K 9/00* (2006.01)
*A61B 6/02* (2006.01)
*G01S 13/88* (2006.01)
*G01S 7/295* (2006.01)
*G01S 13/89* (2006.01)

(52) U.S. Cl.
CPC ............... *G01S 7/295* (2013.01); *G01S 13/887* (2013.01); *G01S 13/89* (2013.01)
USPC ............................. 382/286; 382/154; 378/41

(58) Field of Classification Search
USPC ............ 382/128–132, 154, 276, 286; 342/22, 342/27, 179, 376; 378/41, 57
See application file for complete search history.

(56) References Cited

U.S. PATENT DOCUMENTS 5,182,764 A   1/1993   Peschmann et al.
6,317,509 B1  11/2001  Simanovsky et al.
(Continued)

FOREIGN PATENT DOCUMENTS

WO   2006078570   7/2006

OTHER PUBLICATIONS

International Search Report for International Application No. PCT/IE2010/000037, mailed Sep. 21, 2010.

*Primary Examiner* — Andrae S Allison
(74) *Attorney, Agent, or Firm* — Casimir Jones S.C.

(57) ABSTRACT

An imaging system comprises a transmitter (24, 25), a receiver (24, 25, 21), and a controller (20) for directing the transmitter and the receiver to scan an object in a volume. The controller determines which sub-volumes of the volume the object is located within and then performs a fine scan in those sub-volumes. This reduces overall scanning time. The controller (20) may compare a received signal sample magnitude from the initial scan with a threshold to make the decision. The initial scan may be performed with a spot size to include only one or more particular volume elements within at least some of the sub-volumes.

14 Claims, 5 Drawing Sheets

(56) References Cited

U.S. PATENT DOCUMENTS

| | | |
|---|---|---|
| 6,965,340 B1 | 11/2005 | Baharav et al. |
| 6,972,714 B1 | 12/2005 | Baharav et al. |
| 7,112,775 B2 | 9/2006 | Lee et al. |
| 7,119,731 B2 | 10/2006 | Fleisher |
| 7,145,506 B2 | 12/2006 | Holt et al. |
| 7,224,314 B2 | 5/2007 | Lee et al. |
| 7,265,709 B2 * | 9/2007 | Fleisher et al. ............... 342/22 |
| 7,280,068 B2 | 10/2007 | Lee et al. |
| 7,283,085 B2 | 10/2007 | Lee et al. |
| 7,298,318 B2 | 11/2007 | Baharav et al. |
| 7,327,304 B2 | 2/2008 | Baharav et al. |
| 7,333,055 B2 | 2/2008 | Baharav et al. |
| 7,386,150 B2 | 6/2008 | Fleisher |
| 7,525,500 B2 | 4/2009 | Lee |
| 2005/0117700 A1 | 6/2005 | Peschmann |
| 2005/0231415 A1 * | 10/2005 | Fleisher et al. ............... 342/22 |
| 2005/0270220 A1 | 12/2005 | Baharav et al. |
| 2006/0098773 A1 * | 5/2006 | Peschmann ............... 378/57 |
| 2006/0104480 A1 * | 5/2006 | Fleisher ............... 382/103 |
| 2006/0109160 A1 | 5/2006 | Baharav et al. |
| 2006/0193433 A1 * | 8/2006 | Ledoux et al. ............... 378/57 |
| 2006/0214836 A1 | 9/2006 | Baharav et al. |
| 2008/0043102 A1 | 2/2008 | Rowe et al. |
| 2008/0094296 A1 | 4/2008 | Lee |
| 2008/0094301 A1 | 4/2008 | Lee et al. |
| 2008/0161685 A1 | 7/2008 | Weems et al. |
| 2009/0010386 A1 * | 1/2009 | Peschmann ............... 378/57 |
| 2012/0224669 A1 * | 9/2012 | Ledoux et al. ............... 378/41 |

\* cited by examiner

Super voxel scanning

Sub panels configuration

IMAGE SYSTEM DESIGNED TO SCAN FOR SECURITY THREATS

FIELD

This application relates to imaging systems, such as, for example, for security scanning. It can apply to imaging systems which operate over a wide range of wavelengths.

BACKGROUND

In response to security threats in transportation and public spaces, inspection of people for weapons and other types of contraband is becoming common at security checkpoints at, for example, airports, train stations, sporting events, concerts, federal buildings, and other public and private facilities. Systems using non-ionizing radiation, such as terahertz and millimeter wave, for imaging of concealed weapons, contraband or other items of interest are known. Such systems are described in, for example, U.S. Pat. Nos. 6,972,714, 6,965,340, 7,112,775, 7,224,314, 7,283,085, 7,333,055, 7,327,304, 7,280,068, 7,298,318, and 7,525,500 and U.S. Patent Appl. Pub. Nos. 2005-0270220, 2006-0109160, 2006-0214836, 2008-0161685, 2008-0094301, 2008-0094296.

Other prior publications in this field include US20080043102, WO200678570, U.S. Pat. No. 7,119,731, U.S. Pat. No. 7,145,506, U.S. Pat. No. 7,386,150, and U.S. Pat. No. 7,265,709.

A non-ionizing radiation scanning device must scan a volume in space in order to generate an image. The time required to implement the scan is a function of the data acquisition rate and the size of the volume. Due to the large volume required to image, for example, a human, the refresh rate can be slow giving rise to movement-related blurring of the image.

The invention is directed towards achieving improved performance in operation of a scanning system.

SUMMARY

According to the invention, there is provided an imaging system comprising:
 a transmitter,
 a receiver,
 a controller for directing the transmitter and the receiver to scan an object in a volume, and wherein the controller is adapted to determine which sub-volumes of said volume the object is located within and to perform a fine scan in said sub-volumes.

In one embodiment, the controller is adapted to additionally perform a fine scan of sub-volumes adjoining those determined to include the search object.

In one embodiment, the controller is adapted to additionally perform a fine scan of sub-volumes neighbouring those sub-volumes which adjoin those determined to include the search object.

In one embodiment, the controller is adapted to initially scan the volume using the transmitter and the receiver, to use said initial scan to decide which sub-volumes the object is located within, and to then perform the fine scan in said sub-volumes.

In one embodiment, the controller is adapted to compare a received signal sample magnitude from the initial scan with a threshold to make said decision.

In one embodiment, the controller is adapted to direct the transmitter and the receiver to perform the initial scan with a spot size to include only one or more particular volume elements within at least some of the sub-volumes.

In one embodiment, said volume elements include a volume element which is central within at least some sub-volumes.

In one embodiment, said volume elements include a plurality of particular volume elements in at least some sub-volumes.

In one embodiment, said volume elements are selected in a pre-defined pattern.

In one embodiment, said volume elements are selected in a random pattern.

In one embodiment, the controller is adapted to direct the transmitter and the receiver to perform the initial scan with a spot size encompassing a full sub-volume size.

In one embodiment, the system further comprises an array of reflectors and the controller controls the reflectors.

In one embodiment, the controller is connected to arrays of reflectors in a daisy-chain arrangement for bi-directional control communication.

In one embodiment, the controller is connected to arrays of reflectors in parallel for uni-directional control and timing signals.

In one embodiment, the controller is adapted to control a scan spot size for a fine scan to encompass a full sub-volume which is deemed to include the object.

In one embodiment, the system further comprises an array of reflectors, and wherein the spot size control is achieved by de-focusing using control of the reflector arrays.

In one embodiment, the system is adapted to determine said sub-volumes in part or in full using a sensing system which is separate from the transmitter and the receiver.

BRIEF DESCRIPTION OF FIGURES

The following drawings are given by way of example only to illustrate the invention.

DETAILED DESCRIPTION

Overview

The present application provides an apparatus and method for maximizing the scan volume to accommodate varying shapes or individuals or other items while maximising the refresh rates of images. Specifically, an imaging system can determine which parts of the scan volume are occupied and then scan only those volumes that are occupied.

Unless explicitly stated otherwise, "and" can mean "or," and "or" can mean "and." For example, if a feature is described as having A, B, or C, the feature can have A, B, and C, or any combination of A, B, and C. Similarly, if a feature is described as having A, B, and C, the feature can have only one or two of A, B, or C.

Unless explicitly stated otherwise, "a" and "an" can mean "one or more than one." For example, if a device is described as having a feature X, the device may have one or more of feature X.

"Scan volume" also referred to as "image volume" is the overall volume that can be scanned to generate an image. A scan volume can be any appropriate or desired size. In one embodiment, the scan volume is approximately 2 m by approximately 1.1 m by approximately 1 m. A scan volume contains sub-volumes or super volume elements (referred to as "super voxels"), and these contain volume elements ("voxels").

An imaging system can use any non-ionizing radiation, including but not limited to millimeter wave or terahertz. In one embodiment the system uses millimeter wave illumination to image an object. The incident beam can be focused into a voxel using a reflect array. For imaging the reflect array can be arranged in tiles. Each tile can consist of an array of patch antennas with switching FETs and the associated electronics for controlling the FETs. Each panel constitutes a reflect array. The phases of the individual patches can be configured to achieve a particular pattern in space when the array is illuminated by a horn antenna. The distance from the horn to a patch and the distance from the patch to the focal point can be calculated and summed. The resulting distance can then be converted into wavelengths at the operating frequency. The fractional portion of the distance can be converted into phase by multiplying by 360 degrees. For each patch to constructively contribute to the focus, the phases resulting from the above calculation should be identical or substantially identical. It is possible to approximate this by having the phases agree by better than 180 degrees. To achieve this, the FETs can be selected to add 0 or 180 degree phase shift depending on the calculated phase. A FET can be configured to deliver a phase shift of 180 degrees by turning it on and 0 degrees by turning it off. Thus the voxel can be scanned over a volume by applying appropriate patterns of ones and zeroes to the FETs.

Figure 1:
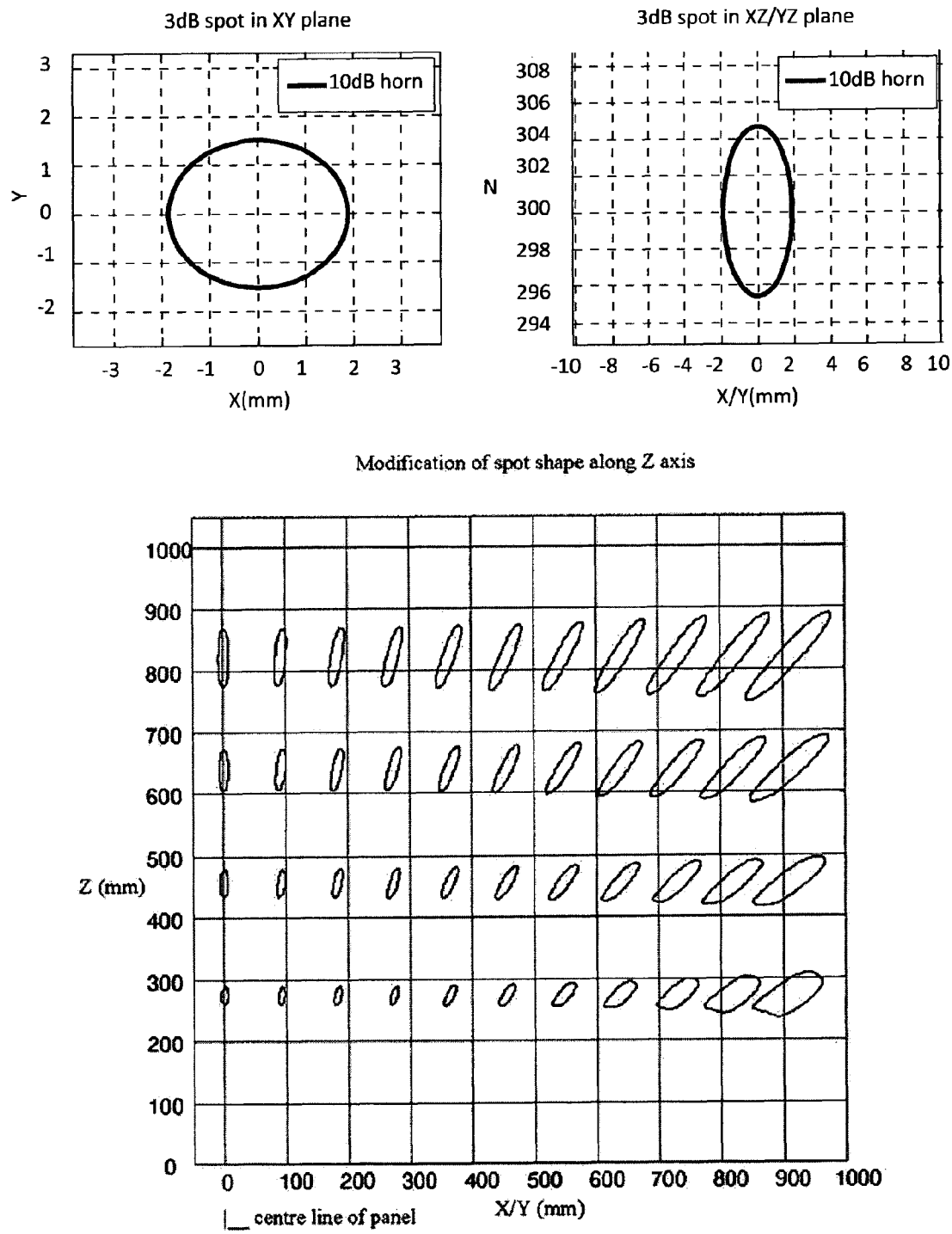
FIG. 1 is a set of diagrams illustrating imaging spot shapes and their modification along a Z axis.

Using the reflect array the volume element or "voxel" can be scanned over a volume in space. The radiation reflected from an object that re-traverses the incident path can be detected and used to create an image of the scanned volume. The voxel produced by the system can be a function of the frequency, reflect array aperture, horn illumination and off-axis scan angle. The voxel can be any shape, such as for example, cubical, spherical, or ellipsoid. The voxel can be any appropriate size. In an embodiment demonstrated in FIG. 1 the voxel can have the approximate dimensions of ~4 mm high by ~3 mm wide by ~10 mm deep. Voxel size can be made smaller by, for example, increasing the panel area or by operating the existing panel at a higher frequency. The voxel details can change as the beam is scanned off bore-sight.

Scanning areas of a scan volume that contain objects requires determining where objects are located within the scan volume. The scan volume can be divided into sub-volumes and each sub-volume searched for the presence of an object. If an object is detected the sub-volume is marked for a subsequent fine scan. In one embodiment, the processor of the system can control imaging so that the scan volume is broken down into sub-volumes. The sub-volumes can be any appropriate size. In one embodiment the sub-volumes are ~24 mm high by ~24 mm wide by ~20 mm deep. The number of voxels in each sub-volume will vary based on sub-volume and voxel size. In an embodiment the sub-volume consists of 72 voxels and the processor restricts the samples per sub-volume to less than 72 to improve the refresh rate.

There are a number of possible approaches to determining if the sub-volume is occupied or not. In one embodiment a sample is taken at the centre of the sub-volume and compared with a threshold. If the magnitude exceeds the threshold, the occupied sub-volume and adjacent sub-volumes can be fine scanned. The threshold can be managed such that the refresh rate is maintained above a minimum, which can be, for example, 10 Hz. In another embodiment, a fixed number of samples, such as for example, 2, 3, 4, 5, 6, 7, 8, 9 or 10, are taken within each sub-volume. The distribution of the samples in the sub-volumes can be in a pre-determined pattern or can be random.

In a further embodiment the beam can be modified such that the beamwidth or spot size is increased to match the sub-volume. This may be referred to as "de-focusing". Such control can be achieved by control of the reflector array. In this embodiment a subset of tiles is selected in an array panel and the tiles are assigned to produce a beam in a given part of the sub-volume. The larger the subset the more defined will be the beam. The beams from the subsets can then combine to produce a multi-beam pattern for sampling the sub-volume. In this embodiment, the noise can be approximately fixed and the signal can be proportional to the gain of the beam. As the beam is de-focused the gain can be reduced and the signal to noise ratio can degrade. In an implementation four subsets per panel are used and this arrangement can yield a signal to noise ratio of 7 dB.

Regardless of how the search is performed, the decision process can involve comparing the sample magnitude with a threshold. If the magnitude exceeds the threshold, then the sub-volume is deemed occupied.

Once a sub-volume has been deemed occupied the voxel sampling strategy must be decided. A simple strategy is to fine scan the occupied sub-volumes only. However, this can lead to missing picture elements particularly at the edge of an object. To overcome this, sub-volumes adjacent to those that are occupied can also be fine scanned.

The system refresh rate can be any appropriate rate that results in reduced or no image blurring. In one embodiment the refresh rate is about 20 Hz, about 15 Hz, about 12 Hz, or about 10 Hz.

Figure 2:
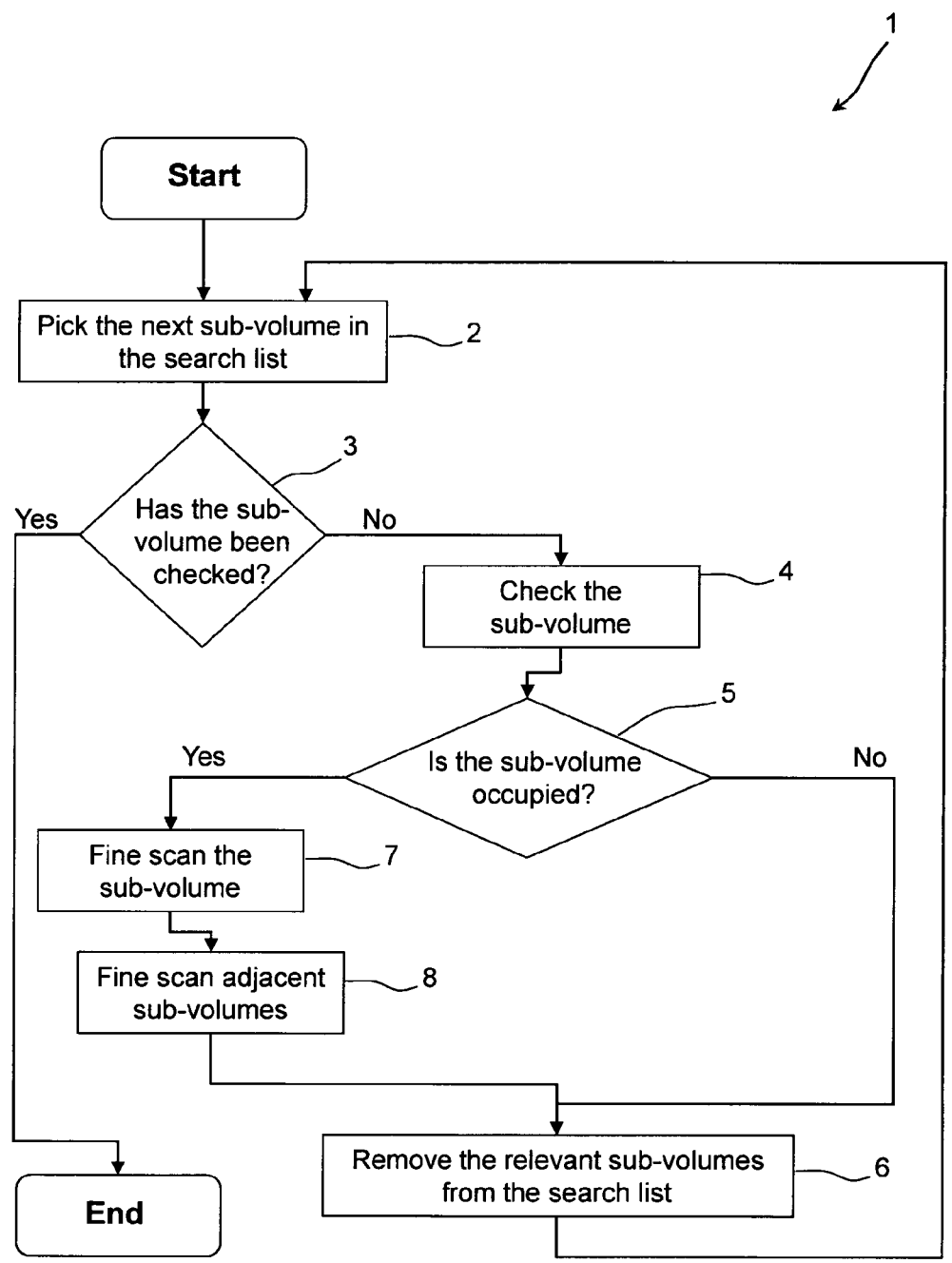
FIG. 2 is a flow diagram illustrating operation of an embodiment of the imaging system.

The basic steps of a search procedure are set out in FIG. 2. In step 2 a sub-volume can be chosen from a search list, and if not previously checked (decision step 3) it can be checked in step 4. If not occupied (decision step 5), it can be removed from the search list in step 6. If occupied, in step 7 this sub-volume can be fine scanned, and in step 8 adjacent sub-volumes can be searched.

Hardware

Figure 3:
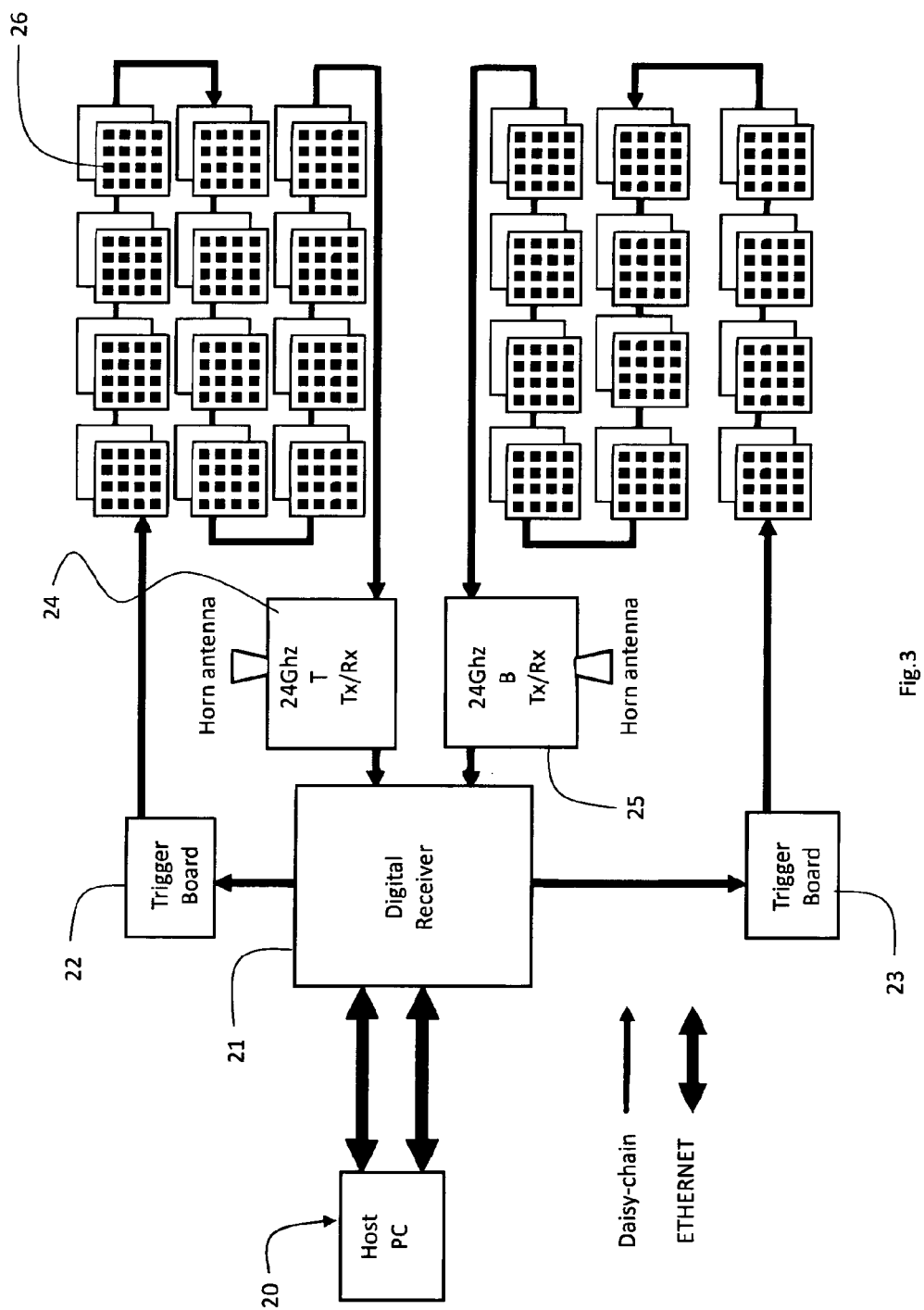
FIGS. 3 and 4 are diagrams illustrating system hardware.
Figure 4:
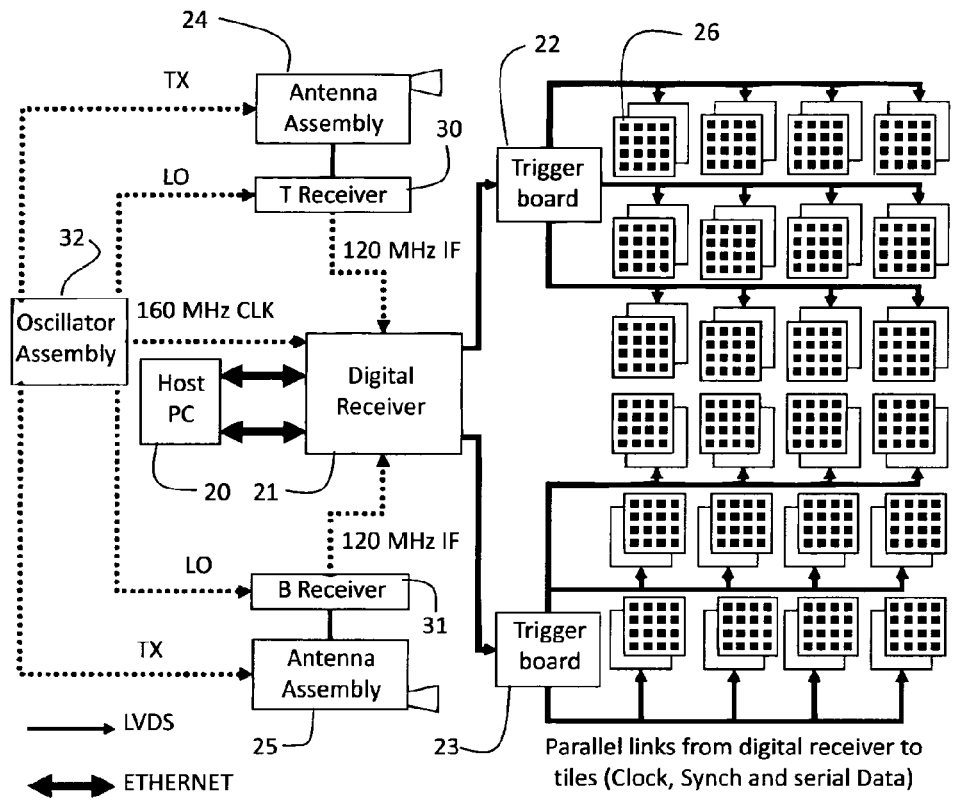

The imaging system can be a real-time imaging system. FIGS. 3 and 4 are block diagrams representing exemplary imaging system hardware.

Referring initially to FIG. 3, a PC 20 is the primary controller for the system and is responsible for all decision making. The PC 20 displays the images and provides a graphical user interface. A single digital receiver 21 can control the panels through two trigger boards 22 and 23. Received radiation responses are via horn antenna circuits 24 and 25. The PC 20 connects to the digital receiver 21 using two Ethernet links. All PC instructions can be sent via the digital receiver 21 and all responses from the system are returned to the PC 20 via the digital receiver 21. The daisy-chain interconnection from the digital receiver 21 to the tiles 26 allows communication of general instructions and data, such as write instructions, uploading reflector switch patterns and diagnostics. In general, the daisy-chain links can be used for bi-directional communication.

FIG. 4 shows trigger boards 22 and 23 and parallel links between them and each tile. These parallel links provide scan block addresses and synchronisation signals. Power is also supplied to the tiles 26 via the trigger boards 22 and 23.

There is a T receiver 30 linked with the antenna circuit 24 and a B receiver 31 linked with the antenna circuit 25. An oscillator assembly 32 is linked with the receivers 30 and 31, with the antenna circuits 24 and 25, and with the digital receiver 21.

In one embodiment a transceiver can transmit and receive signals within the frequency band −24 GHz to 24.25 GHz. In this embodiment, the intermediate frequency (IF) can be fixed at 120 MHz. A transmit signal and a local oscillator for both transceivers can be phased locked to a 160 MHz reference signal generated in the oscillator assembly 32. This very low phase noise signal can serve as the master oscillator for the entire system. Screened balanced pairs can be used to connect the IFs and 160 MHz reference to the digital receiver. The transmit power can be disabled by sending an appropriate message to the transceivers. The lock status of the oscillator assembly 32 can also be queried.

In a setup mode patterns can be loaded into the tiles 26. In a scan mode, patterns can be written using a 40 MHz clock and synchronisation pulse delivered by the digital receiver 21 via the trigger boards 22 and 23. Blocks of patterns can be addressed using addresses provided by the digital receiver 21. Polling via the daisy chain can gather statistics on all sub-systems connected to the daisy chain.

The memory requirement is dictated by the maximum number of patterns envisaged for the system. In one embodiment the memory requirement for the each tile is approximately 4 GB.

Using Sample Voxel Scan Scheme

Figure 5:
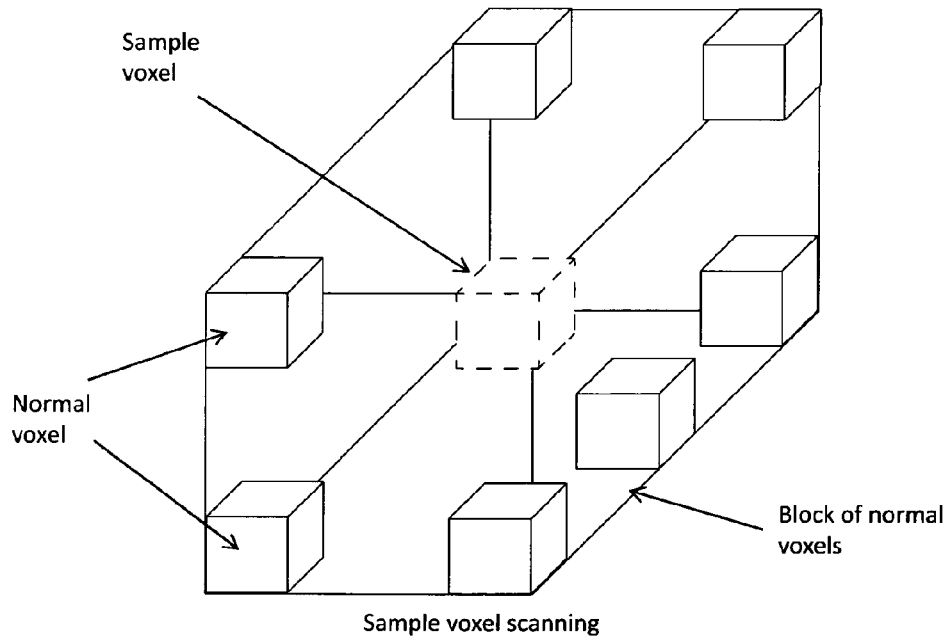
FIG. 5 is a diagrammatic representation of sample voxel scanning.

The term Sample Voxel Scan Scheme means that in an initial search of the scan volume, the system focuses on one or more voxels within each sub-volume ("super voxel"). The voxel can be a central voxel or it can be a number of voxels in a random or pre-determined regular pattern. A central voxel of a super voxel is shown in FIG. 5.

The super voxel can consist of NX×NY×NZ voxels. These integer numbers can be fixed or variable. The threshold can be fixed or in another embodiment it can be adjusted by the processing algorithm.

Each sample voxel amplitude is compared to the threshold. If the sample voxel amplitude is greater than the threshold then the super voxel volume is fine scanned. This method is called normal sample scan scheme.

In order to display the results, the 3D data is flattened to a 2D image using the maximum along Z direction to get an intensity map. Other approaches are also possible.

An alternative sample voxel scan scheme consists of flattening the sample voxels first using the maximum along Z approach and then applying the threshold. This reduces the number of sample voxels that have to be processed. This method is called flat sample scan scheme.

Using. Super Voxel Scan Scheme

Figure 6:
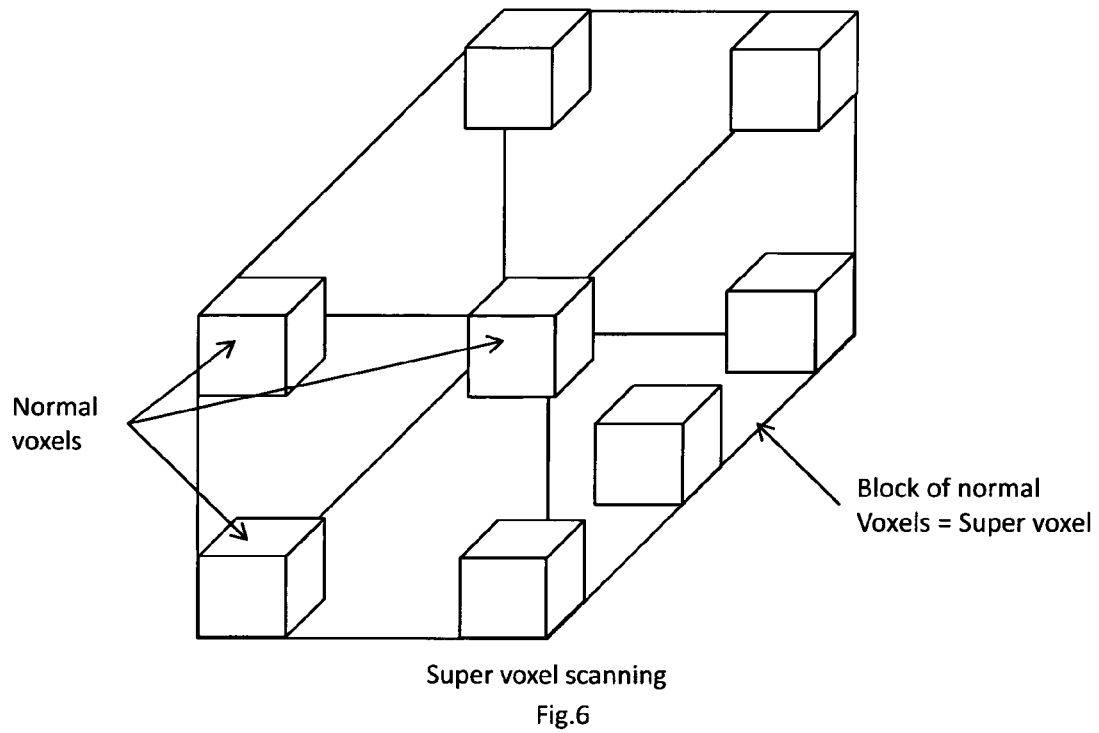
FIG. 6 is a diagrammatic representation of super voxel scanning.

In the Super Voxel Scan Scheme the system first performs a coarse scan of the complete scan volume using a larger spot size which can encompass a full sub-volume (super-voxel). If the signal of a sub-volume in the scan volume exceeds a given threshold, all voxels in the sub-volume are fine scanned. See FIG. 6.

Each super voxel amplitude is compared with the threshold, and if the super voxel amplitude is greater than the threshold then the super voxel is fine scanned. This method is called super voxel scan scheme.

In order to display the results, the 3D data is flattened to a 2D image using the maximum along Z direction to get an intensity map.

Figure 7:
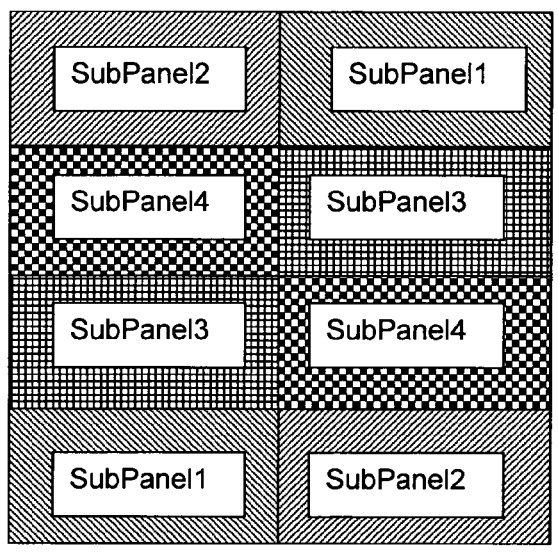
FIG. 7 is a representation of sub-panel configurations.

Filling the super voxel volume is achieved by making the panel look at different locations in the super voxel volume at the same time (multibeam reflect array); this reduces the power received at the horn from the super voxel as this power is shared over a bigger volume. A possible implementation is to divide the panel into four sub-panels as shown in FIG. 7.

The signal to noise ratio for the super voxel sampling scheme can be reduced to 7 dB as a consequence of the beam defocusing.

A flat version of the super voxel scan scheme similar to the flat sample scan scheme also is possible.

A number of strategies are possible once the sub-volume or super voxel is selected for fine scanning The selected super voxel only is fine scanned.

The nearest on-axis adjacent 6 super voxels are also fine scanned.

The next nearest on-axis adjacent 12 super voxels are also fine scanned.

The nearest cube of 26 super voxels is also fine scanned.

Comparison of Sample Voxel Scan Scheme and Super Voxel Scan Scheme

The sample voxel scan scheme in one embodiment uses the full approximately 20 dB signal to noise ratio of the imager. The super voxel scan scheme has a signal to noise ratio of in one example approximately 7 dB and is therefore more susceptible to errors in noisy imaging conditions. The super voxel scan scheme samples the super voxel, the sample voxel scan scheme samples one or more voxels in the super voxel, thus the sample voxel scan scheme can overlook an object that is located at the edge of a super voxel.

It is envisaged that the controller of the system may use a method other than using the phased array antenna system to determine the location of the target in the volume. It may for example execute algorithms using images fed by two or more video cameras to determine the location of a target in a process akin to the manner in which a person's eyes judge depth. Alternatively, laser devices could be used. Another example is an ultrasonics range-finder arrangement. Such an arrangement may be used instead of or in addition to an initial scan using the transmitters and receivers.

The embodiments described above have been set forth herein for the purpose of illustration. This description, however, should not be deemed to be a limitation on the scope of the invention. Various modifications, adaptations, and alternatives may occur to one skilled in the art without departing from the claimed inventive concept. The spirit and scope of the invention are indicated by the following claims.

The invention claimed is:

1. An imaging system comprising:
a transmitter
a receiver
an array of reflectors,
a controller for directing the transmitter, the receiver, and the reflectors to scan an object in a volume,
wherein the controller determines which sub-volumes of said volume the object is located within and to perform a fine scan in said sub-volumes,
wherein the controller initially scans the volume using the transmitter, the receiver, and the reflectors to use said initial scan to decide which sub-volumes the object is located within, and to then perform the fine scan in said sub-volumes, again using said transmitter, receiver, and reflectors;
wherein the controller compares a received signal sample magnitude from the initial scan with a threshold to make said decision; and
wherein the controller directs the transmitter and the receiver to perform the initial scan with a spot size to include only one or more particular volume elements within at least some of the sub-volumes.

2. The imaging system of claim 1, wherein the controller additionally performs a fine scan of sub-volumes adjoining those determined to include the search object.

3. The imaging system of claim 2, wherein the controller additionally performs a fine scan of sub-volumes neighbouring those sub-volumes which adjoin those determined to include the search object.

4. The imaging system of claim 1, wherein said volume elements include a volume element which is central within at least some sub-volumes.

5. The imaging system of claim 1, wherein said volume elements include a plurality of particular volume elements in at least some sub-volumes.

6. The imaging system of claim 1, wherein said volume elements are selected in a pre-defined pattern.

7. The imaging system of claim 1, wherein said volume elements are selected in a random pattern.

8. The imaging system of claim 1, wherein the controller directs the transmitter and the receiver to perform the initial scan with a spot size encompassing a full sub-volume size.

9. The imaging system of claim 1, wherein the controller is connected to the arrays of reflectors in a daisy-chain arrangement for bi-directional control communication.

10. The imaging system of claim 1, wherein the controller is connected to the arrays of reflectors in parallel for uni-directional control and timing signals.

11. The imaging system of claim 1, wherein the controller controls a scan spot size for a fine scan to encompass a full sub-volume which is deemed to include the object.

12. The imaging system of claim 11, wherein the controller controls focus using control of the reflectors.

13. The imaging system of claim 1, wherein the system determines said sub-volumes at least in part using a sensing system which is separate from the transmitter and the receiver.

14. The imaging system of claim 1, wherein the controller initially scans the volume and perform the fine scan in said sub-volumes by: reflecting an incident beam from the transmitter along an incident path onto the object using the array of reflectors, radiation reflected from the object re-traverses the incident path to the array of reflectors, wherein the radiation reflected from the object is redirected to the receiver.

* * * * *